United States Patent
Drobe et al.

(10) Patent No.: US 8,540,366 B2
(45) Date of Patent: Sep. 24, 2013

(54) MANUFACTURING OF PROGRESSIVE SPECTACLE LENS CUSTOMIZED BASED ON BLUR PERCEPTION

(75) Inventors: Björn Drobe, Charenton-le-Pont (FR); Guillaume Giraudet, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 124 days.

(21) Appl. No.: 13/376,558

(22) PCT Filed: Jun. 7, 2010

(86) PCT No.: PCT/FR2010/051120
§ 371 (c)(1),
(2), (4) Date: Dec. 6, 2011

(87) PCT Pub. No.: WO2010/142899
PCT Pub. Date: Dec. 16, 2010

(65) Prior Publication Data
US 2012/0092614 A1    Apr. 19, 2012

(30) Foreign Application Priority Data
Jun. 10, 2009   (FR) ..................................... 09 53831

(51) Int. Cl.
*G02C 7/06*    (2006.01)
(52) U.S. Cl.
USPC .................................. 351/159.73; 351/159.75
(58) Field of Classification Search
CPC ........ G02C 7/024; G02C 7/025; G02C 7/027; G02C 7/028; G02C 7/061; G02C 7/063; G02C 7/065; G02C 7/066; G02C 7/068
USPC .............. 351/159.4–159.49, 159.73, 159.75, 351/159.76
See application file for complete search history.

(56) References Cited

U.S. PATENT DOCUMENTS

| | | |
|---|---|---|
| 6,199,984 B1 | 3/2001 | Menezes |
| 6,652,096 B1 | 11/2003 | Morris et al. |
| 6,956,682 B2 * | 10/2005 | Wooley ......................... 398/154 |
| 7,066,597 B2 * | 6/2006 | Miller et al. ............. 351/159.42 |
| 2004/0027679 A1 | 2/2004 | Welk et al. |
| 2010/0149484 A1 | 6/2010 | Berthezene et al. |

FOREIGN PATENT DOCUMENTS

| | | |
|---|---|---|
| EP | 1837699 A1 | 9/2007 |
| WO | 00/55678 A1 | 9/2000 |
| WO | 2007/068819 A1 | 6/2007 |

OTHER PUBLICATIONS

Cufflin et al., "Effect of blur adaptation on blur sensitivity and discrimination in emmetropes and myopes", *Invest. Ophthalmol. Vis. Sci.* 48(6):2932-9, Jun. 2007, 8 Pages.

Ciuffreda et al., "Conceptual model of human blur perception", *Vision Research* 47:1245-52, 2007, 8 Pages.

Ciuffreda et al., "'Bothersome blur': a functional unit of blur perception", *Vision Research* 46:895-901, 2006, 7 Pages.

Schmid et al., "Blur detection thresholds in childhood myopia: single and dual target presentation", *Vision Research* 42:239-47, 2002, 9 Pages.

Stahl, "Amplitude of human head movements associated with horizontal saccades", *Exp Brain Res* 126(1):41-54, 1999, 14 Pages.

* cited by examiner

*Primary Examiner* — Darryl J Collins
(74) *Attorney, Agent, or Firm* — Robert Iannucci; Seed IP Law Group PLLC

(57) ABSTRACT

The invention relates to the making of a progressive spectacle lens for customizing the lens based on the blur perception by a future lens wearer. Accordingly, a blur threshold value is determined for the wearer according to a blur perception criterion that varies based on an optical-power addition value prescribed for the wearer. The blur threshold value is associated with a reference sight direction for the lens provided to the wearer.

15 Claims, 3 Drawing Sheets

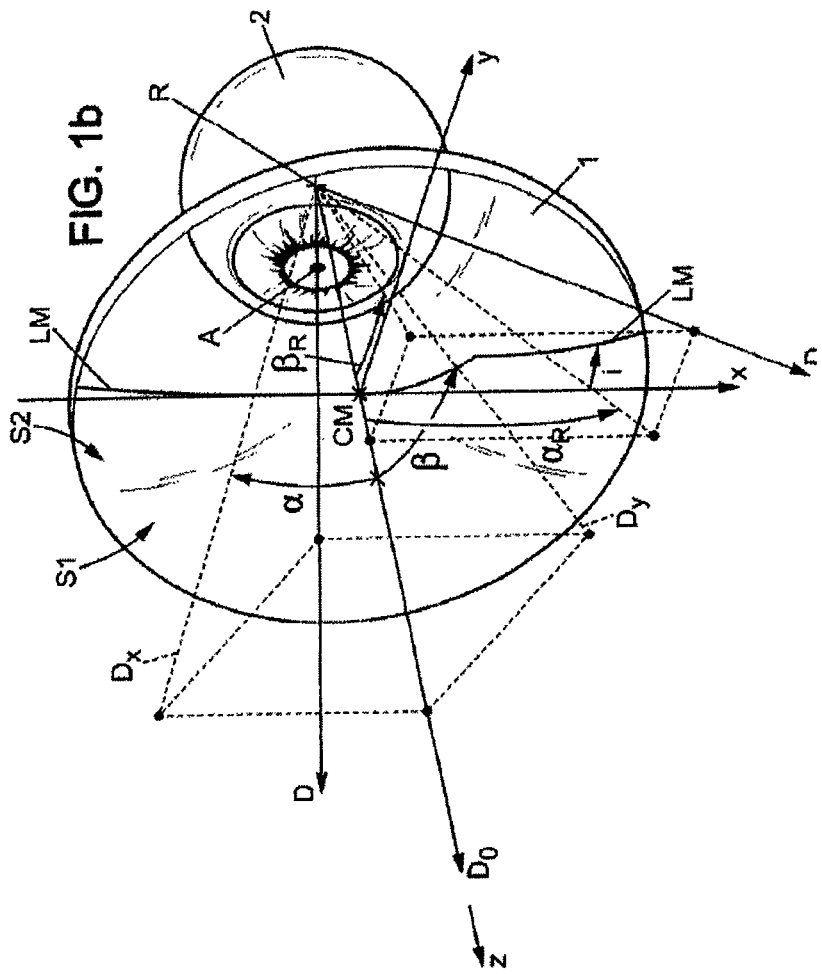

MANUFACTURING OF PROGRESSIVE SPECTACLE LENS CUSTOMIZED BASED ON BLUR PERCEPTION

Figure 2A:
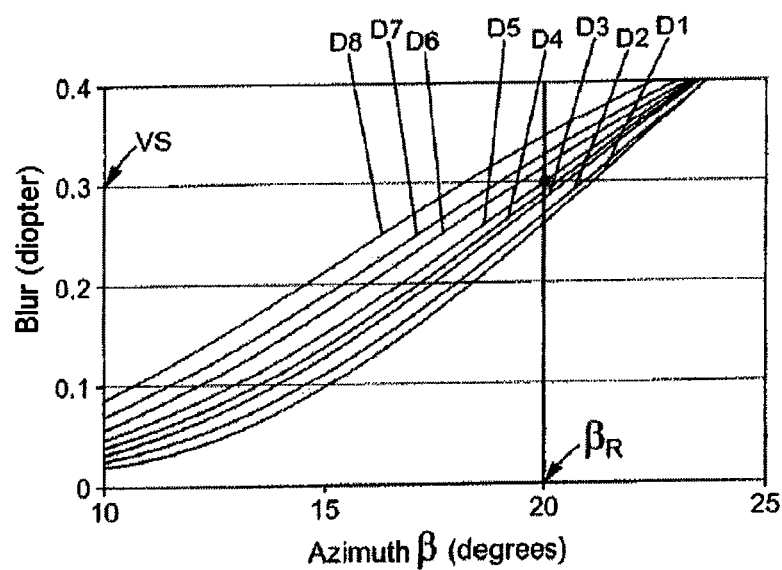

The present invention relates to the manufacturing of a progressive spectacle lens, which is customized as a function of a blur perception of a wearer for whom the lens is intended.

In a known manner, a difference between the ametropia of a wearer of spectacles and the ophthalmic correction which is afforded by a spectacle lens used by this wearer produces a clouding of his vision, called blur. When this blur results from a defocusing of the image at the rear of the retina, it is spontaneously removed by an accommodation of the wearer's eye, to within the accommodative delay (or "accommodation lag") and as long as the wearer's limit of ocular accommodation is not exceeded. This results, however, in visual fatigue for the wearer. But in a general manner, outside of the ability for ocular accommodation, the blur which results from a difference between the ametropia of a wearer and the ophthalmic correction of a spectacle lens which is used by the latter constitutes a defect of his vision.

Progressive spectacle lenses allow a presbyopic wearer to see sharply at variable distances through a far vision zone of the lens, a near vision zone, and through a channel which connects the far and near vision zones. But outside of these zones they exhibit variations in optical power and in astigmatism which give rise to visual blur for the wearer. Progressive lenses such as these are then designed to achieve a compromise between the width of the visual field in which the optical power and the astigmatism of the lens correspond to the ophthalmic prescription which is established for the wearer, and a blur which remains limited for directions of gaze which pass through the lens outside of the far and near vision zones. In particular, the greater the addition value possessed by this lens, the greater the blur outside the far and near vision zones of a progressive lens. It is recalled that the addition of a progressive lens is the difference between the values of optical power of this lens respectively for a reference direction for near vision and a reference direction for far vision.

Moreover, numerous physiological studies have shown that the perception of visual blur varies considerably between different subjects. Thus, two wearers of spectacles who have identical ophthalmic prescriptions and who are fitted with spectacle lenses, likewise identical, may be inconvenienced differently by the blur which is produced by these lenses, for certain oblique directions of their gaze. For example, a first wearer may declare himself to be inconvenienced by this blur whereas a second wearer may confirm good visual comfort. The compromise which is achieved by these identical lenses between their ophthalmic function and the residual blur that they produce is then appropriate for the second wearer, and must be modified for the first. It is therefore necessary to take account of the sensitivity of each wearer to the perception of blur when allocating a progressive lens to this wearer.

However, it may be difficult for a tolerance of the blur which is low, or indeed very low, of a future wearer of progressive lenses, to be compatible with the addition value which is prescribed for this wearer, when this addition value is high. It is therefore also necessary to evaluate the sensitivity of each wearer to visual blur in a manner consistent with the constraints which result from the addition value which is prescribed for this wearer.

A first object of the present invention is therefore to provide a progressive spectacle lens which is customized as a function of the perception of the blur by the wearer for whom the lens is intended.

A second object of the invention consists in determining the blur which is tolerated by the wearer in conjunction with the optical power addition value which is prescribed for him, so that the level of the blur which is determined is compatible with the addition value when making the progressive lens.

To achieve these and other objects, the invention proposes a method for manufacturing a progressive spectacle lens which is intended for an identified wearer, and which is customized as a function of a perception of blur by this wearer, the method comprising the following steps:

/1/ obtaining an ophthalmic prescription for the wearer, comprising a prescribed value of optical power in far vision, a prescribed addition value and a characterization of an astigmatism of said wearer;

/2/ obtaining a blur perception threshold value for the wearer;

/3/ obtaining respective blur values for a series of progressive ophthalmic lenses corresponding to variable prescriptions, and for a reference direction of gaze which is offset transversely with respect to a meridian line of the lenses, this reference direction of gaze being determined by an elevation reference value along the meridian line and an azimuth reference value measured from and transversely with respect to the meridian line;

/4/ selecting a final lens on the basis of at least one initial lens belonging to the series used in step /3/, the final lens corresponding to the wearer's prescription and having a blur value for the elevation and azimuth reference values which exhibits a discrepancy of less than 0.50 diopters in absolute value, with respect to the blur perception threshold value obtained for the wearer in step /2/; and /5/ manufacturing the spectacle lens which is intended for the wearer in accordance with the final lens selected in step /4/.

According to the invention, step /2/ itself comprises the following two sub-steps:

/2-1/ selecting a blur perception criterion as a function of the addition value which is prescribed for the wearer, from among the following criteria:

when this addition value is less than or equal to a first fixed addition value, the blur perception threshold value is a first blur limit below which the wearer does not detect the blur, and beyond which he detects the blur;

when the prescribed addition value for the wearer lies between the first fixed addition value and a second fixed addition value which is greater than the first fixed addition value, the blur perception threshold value is a second blur limit below which the wearer does not experience any visual inconvenience which is caused by the blur, and beyond which he experiences visual inconvenience which is caused by the blur; and when the prescribed addition value for the wearer is greater than or equal to the second fixed addition value, the blur perception threshold value is a third blur limit below which the wearer is capable of reading alphanumeric characters, and beyond which he is no longer capable of reading the alphanumeric characters because of the blur; and then /2-2/ determining the blur perception threshold value for the wearer by using the selected criterion.

Thus, according to a first aspect of the invention, the progressive lens which is allocated to the wearer is selected not only as a function of the wearer's ophthalmic prescription, but also so that the lens produces a blur value for the reference direction of gaze, which corresponds substantially to a blur perception threshold established for the wearer. This blur perception threshold which is reproduced for the reference direction of gaze therefore constitutes a customization of the progressive lens, supplementary to the conformity of the lens to the wearer's ophthalmic prescription. This customization at least partially determines the design of the progressive lens with which the wearer is provided.

According to a second aspect of the invention, the blur perception threshold is determined for the wearer according to a criterion which varies as a function of the addition value which has been prescribed for him:

for low addition values, the criterion is that of the detection of the blur by the wearer;

for intermediate values of the addition, the criterion is that of an inconvenience experienced which is due to blur; and for high addition values, the criterion is that of the loss of readability of an alphanumeric character.

The criterion which is used to determine the value of the blur to be allocated to the reference direction of gaze, in the progressive lens which is provided to the wearer, is therefore all the less demanding the higher the prescribed addition value. Now, for one and the same wearer, the blur perception threshold value which is obtained is higher on replacing the blur detection criterion by that of the inconvenience experienced, and still higher on replacing said criterion by that of the readability. In this way, the value of the blur which is associated with the reference direction of gaze is compatible with the addition value, so as to determine the design of the progressive lens with which the wearer is provided. This compatibility is ensured even when the addition value is high.

Furthermore, when the addition value which is prescribed for the wearer is low, the criterion which is the most demanding is used to characterize the perception of the blur by the wearer. In this case, the lens affords the slightly presbyopic wearer a sensation of good visual acuity for all the azimuth values less than the azimuth reference value, at least for the elevation reference value.

According to a refinement of the invention, the blur value which is obtained in step /3/ for each lens of the series is calculated as a sum which comprises the following two contributions:

a first positive contribution which varies as a function of a first absolute difference between on the one hand an optical power value deduced from the wearer's prescription for the elevation reference value, and on the other hand an optical power value of the lens for the respective reference values of elevation and of azimuth; and a second positive contribution which varies as a function of a second absolute difference between, on the one hand the characterization of the astigmatism of the wearer obtained in step /1/, and on the other hand a characterization of astigmatism of the lens for the respective reference values of elevation and of azimuth.

The first contribution furthermore varies as a function of the addition value of the lens so that, for at least one fixed value of the first difference, the first contribution is an increasing or stepwise increasing function of the addition value of the lens. Thus, the more presbyopic the wearer, the higher the first contribution. In this way, the customization, proposed by the invention, of the lens takes into account the wearer's residual accommodating ability which allows him to compensate for a power defect of the lens, notably for the reference direction of gaze. The requirement to reduce the blur for the lens, for the reference direction of gaze, is therefore not overplayed with respect to the wearer's real need.

Figure 2B:
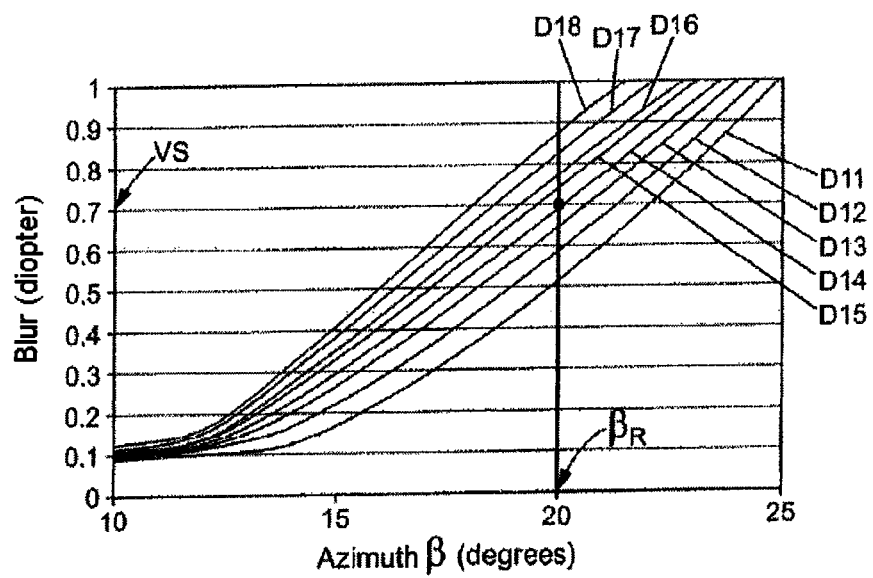
Figure 2C:
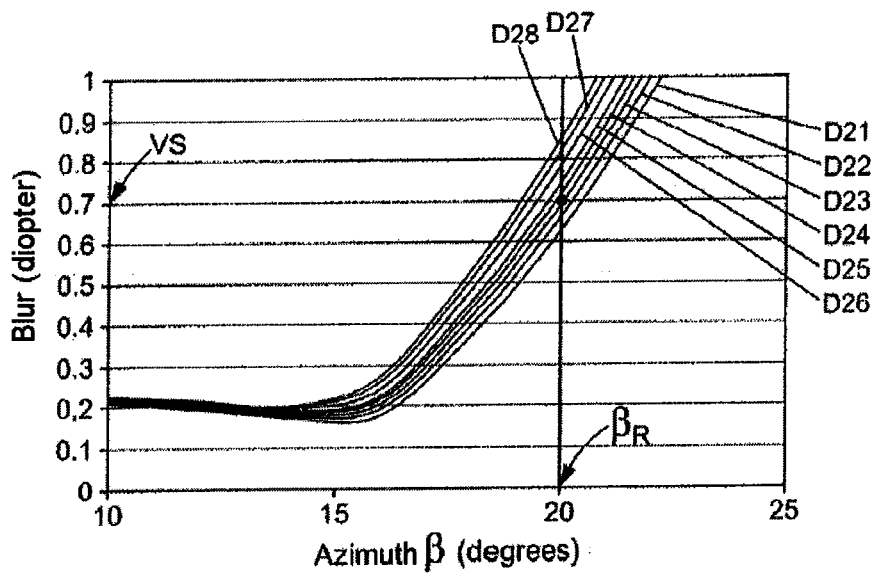
Figure 3A:
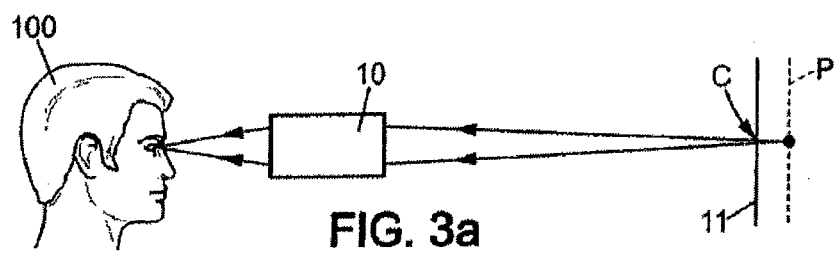
Figure 3B:
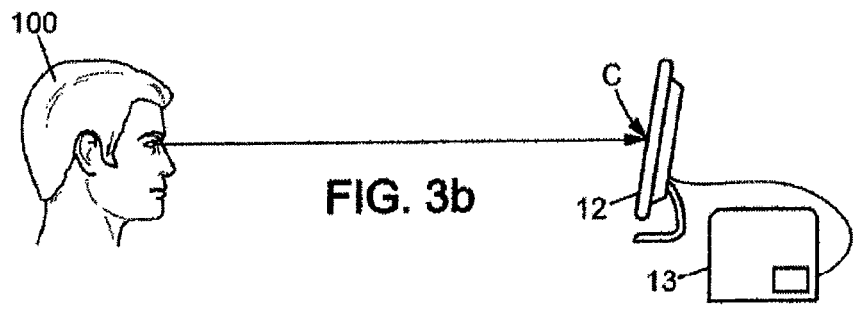

Other particular features and advantages of the present invention will be apparent in the description hereinafter of nonlimiting examples of implementation, with reference to the appended drawings, in which:

FIGS. 1a and 1b are respectively lateral and perspective views of a spectacle lens made according to the invention;

FIGS. 2a to 2c are three charts of blur variation, respectively for progressive lenses of addition 1.00 diopter, 2.00 diopters and 3.00 diopters; and FIGS. 3a and 3b illustrate two blur perception tests that may be used in implementations of the invention.

For clarity reasons, the dimensions of the elements which are represented in FIGS. 1a and 1b do not correspond to real dimensions, nor to real ratios of dimensions. Furthermore, references or notations which are repeated identically in different figures designate identical elements, or ones having identical functions.

In the subsequent description, the optical and physiological parameters which are not specified and which are necessary for calculating the optical characteristics of the spectacle lenses are taken equal to their usual values, known to the person skilled in the art. In particular, the near vision distance is equal to 40 cm (centimeter).

In accordance with FIGS. 1a and 1b, an ophthalmic spectacle lens 1 comprises a portion of transparent material which is limited by an anterior face S1 and a posterior face S2 of the lens. The faces S1 and S2 are respectively convex and concave. The lens 1 may consist of an arbitrary material which is adapted for the ophthalmic application. This may be a mineral or organic material, or optionally a hybrid material, or else a combination of several juxtaposed portions of various transparent materials.

FIG. 1b shows the lens 1 in front of an eye 2 of a wearer, such as this lens is intended to be used when it is assembled in a spectacle frame (not represented) placed on the wearer's face. The lens 1 is then fixed with respect to the wearer's face, but the eye 2 can rotate behind the lens. D designates an arbitrary direction of gaze of the wearer. It passes through the center of rotation R of the eye 2, and through a vertex A of the eye's crystalline lens, commonly called the apex. The direction D varies when the eye 2 rotates about the center R.

Moreover, the lens 1 possesses a fitting cross CM which is situated on its anterior face S1. An orthonormal reference system is then defined, having the fitting cross CM as origin and with axes which are denoted x, y and z. The z axis coincides with a direction of gaze $D_0$ of the wearer when he is looking straight ahead. The x and y axes are then approximately tangent to the surface S1 at the fitting cross CM. The x axis is vertical when the wearer of the lens 1 holds his head vertically, and is oriented downwards. The y axis is horizontal, and is oriented toward the wearer's nose for each lens of the pair of spectacles. $D_x$ and $D_y$ designate the projections of the direction of gaze D on the xz and yz planes, respectively. Within the xz plane, α is the angle between the direction $D_0$ and the projection $D_x$, and is called the height of the direction of gaze D. Likewise, β is the angle between the direction $D_0$ and the projection $D_y$ within the yz plane, and is the azimuth of the direction of gaze D. In this way, the elevation values α are positive and negative for directions of gaze D which pass below and above the fitting cross CM, respectively. Simultaneously, the azimuth values β are positive when the eye is turned toward the wearer's nose, and negative when the eye is turned toward the corresponding temporal side.

The lens 1 is a progressive lens. Stated otherwise, it possesses an optical power which varies as a function of the direction of gaze D. This optical power results from the respective shapes of the faces S1 and S2, as well as the value of the refractive index of the transparent material which constitutes the lens. The progressive lens is characterized by an optical power value which is produced for a reference direction for far vision through the lens, and by another optical power value which is produced for a reference direction for near vision. The addition of the progressive lens, which is denoted Add and which is the difference between the respective values of optical power for the directions of reference for far vision and for near vision is then defined. The optical power value for near vision is greater than that for far vision, so that the addition has positive values. In a known manner, the variations in the optical power of a progressive lens give rise to variations in an astigmatism of this lens, which is known by the term unwanted astigmatism.

A progressive lens is then characterized by the distributions of the values of optical power and astigmatism, which are functions of the values of elevation $\alpha$ and of azimuth $\beta$ of the direction of gaze D. These distributions characterize the design of the progressive lens. In a known manner, two progressive lenses which possess optical power values which are identical for the directions of reference for far vision and near vision, may differ through their variations in optical power and in astigmatism outside of these reference directions. In the jargon of the person skilled in the art, these progressive lenses differ through their respective designs.

FIG. 1b also shows a meridian line LM of the progressive lens 1. This meridian line is the trace of the direction of gaze D in the face S1 of the lens when the wearer looks at objects which are situated in front of him at variable distances. The meridian line LM connects the reference directions for far vision and near vision. Furthermore, the reference direction for near vision is offset azimuthally toward the wearer's nose, with respect to the reference direction for far vision, by an angle which is denoted i and is called the inset. Usually, the inset i lies between 4 and 6.5° (degrees).

In a known manner also, the ophthalmic prescription of a presbyopic subject comprises a prescribed value of optical power for far vision, a prescribed addition value, and a characterization of the wearer's astigmatism.

The lens which is produced according to the invention and with which the presbyopic subject is provided, is selected on the basis of an initial lens, the latter arising from a series of progressive lenses which are available.

It is assumed firstly that this series of progressive lenses comprises several lenses which correspond to the wearer's prescription, and which are called initial lenses in the present description of the invention. A value of the blur that would be produced by each of these initial lenses is then determined for the wearer, for a reference direction of gaze which is fixed. This reference direction of gaze is denoted $D_R$, and is associated with a reference value $\alpha_R$ of the height as well as with a reference value $\beta_R$ of the azimuth.

The azimuth reference value $\beta_R$ may lie between 10° and 20°, preferably between 13° and 17°, in absolute value. Preferably, it is positive, so that the direction $D_R$ is offset with respect to the xz plane toward the wearer's nose. According to a refinement of the invention, the value $\beta_R$ may be obtained on the basis of a measurement of an amplitude of eye movements performed by the future wearer of the lens. Such a measurement of the wearer's ocular movements is assumed to be known, and reference may be made to one of the numerous documents available which describe an operative mode for performing such a measurement. The use of a reference direction of gaze which is itself determined as a function of the wearer makes it possible to adjust the width of the field of the lens in which the blur is limited by the invention, to that part of the lens which the wearer will use the most.

Preferably also, the reference direction of gaze $D_R$ may pass through at least one of the progressive lenses of the series which is used in a near vision zone or in a far vision zone of this lens, or at a lateral limit of such a zone. When the direction $D_R$ passes through or is at the limit of the near vision zone, the elevation reference value $\alpha_R$ may lie between 20° and 45°, preferably between 26° and 38°. In this case, the azimuth reference value $\beta_R$ is preferably greater than the inset i of at least one of the lenses of the series. When the direction $D_R$ passes through or is at the limit of the far vision zone, the elevation reference value $\alpha_R$ may lie between −10° and 2° with respect to the gaze direction $D_0$ which passes through the fitting cross CM of each lens.

By way of illustration, it will be presupposed hereinafter that the reference direction of gaze $D_R$ corresponds to the elevation reference value $\alpha_R$ of 36° and to the azimuth reference value $\beta_R$ of 20°. If the inset i of the lenses is equal to about 5°, the direction $D_R$ is offset by about 15° with respect to the reference direction for near vision in the direction of the wearer's nose.

The value of the blur of each initial lens for the direction $D_R$ is calculated as a sum of a first defocusing contribution ("defocus") and of a second astigmatism contribution, each positive.

The first contribution depends on the absolute value of the difference between on the one hand an optical power value which is deduced from the wearer's prescription for the elevation reference value $\alpha_R$, and on the other hand a value of the optical power of the lens for the reference values of elevation $\alpha_R$ and of azimuth $\beta_R$. The optical power value which is deduced from the wearer's prescription may be the prescribed value for far vision when the value $\alpha_R$ is equal to the elevation of the reference direction for far vision. In the example of the present description where the value $\alpha_R$ is equal to 36° and corresponds to the elevation of the reference direction for near vision, the optical power which is deduced from the prescription is equal to the prescribed value for far vision increased by the prescribed value for the addition. Moreover, the value of the optical power of the lens for the elevation $\alpha_R$ and azimuth $\beta_R$ values is commonly designated by wearer power for the direction $D_R$, in the jargon of the person skilled in the art.

The first contribution, which is denoted $C_1$, therefore results from an inadequacy of the optical power correction which the wearer is afforded by each initial lens for the direction $D_R$, with respect to a theoretical correction which is deduced from his prescription. Furthermore, this first contribution may vary as a function of the addition value, to take account of the wearer's residual accommodating ability.

According to a possible mode of calculation of the first contribution to the blur of each initial lens, said contribution is equal to the absolute difference between the optical power value which is deduced from the prescription, denoted P, and the wearer power, denoted PPO, multiplied by a factor itself equal to:

zero when the addition value Add of the lens is less than or equal to a first fixed addition value, denoted $Add_1$: $C_1=0$ if $Add \leq Add_1$;

a half when the addition value Add of the lens lies between the first fixed addition value and a second fixed addition value, denoted $Add_2$: $C_1 = 0.5 \times |P - PPO|$ if $Add_1 < Add < Add_2$; and unity when the addition value Add of the lens is greater than or equal to the second fixed addition value: $C_1 = |P - PPO|$ if $Add \geq Add_2$.

Stated otherwise, the wearer's residual accommodation is assumed to be sufficient to compensate for the defect of correction in terms of optical power when the addition is less than or equal to $Add_1$. It makes it possible to partially compensate for this correction defect when the addition is intermediate between $Add_1$ and $Add_2$, and it no longer intervenes beyond $A_2$. Thus, the first contribution to the blur is a stepwise increasing function of the addition, at constant value of the first difference between the optical power deduced from the prescription and the wearer power.

According to another possible mode of calculation of the first contribution to the blur of each initial lens, said contribution is equal to the absolute difference between the optical power value which is deduced from the prescription and the wearer power, divided by a decreasing function of the addition value of the lens, or divided by an increasing function of an amplitude of accommodation determined for the wearer. This second mode of calculation is a refinement of the previous one. For example, the function of the wearer's amplitude of accommodation may be equal to exp(AA), where exp designates the exponential function and AA is the wearer's amplitude of accommodation. This amplitude of accommodation can itself be calculated according to Hofstetter's formula as a function of the age AG of the wearer: AA(diopters)= 18.5−AG/3 when AG is less than 55.5 years, and AA is zero for a wearer more than 55.5 years old.

The second contribution to the blur value of an initial lens results from the mismatch between the astigmatism which has been diagnosed for the wearer on the one hand, and the astigmatism value of the lens for the direction $D_R$ on the other hand. In the jargon of the person skilled in the art, this second contribution depends on the resulting astigmatism, denoted ASR. For example, the second contribution, denoted $C_2$, may be equal to an absolute difference between the wearer's astigmatism characterization which is indicated in the prescription and the characterization of astigmatism of the lens for the reference values of elevation $\alpha_R$ and of azimuth $\beta_R$, divided by $2^{1/2}$. Thus: $C_2 = ASR/2^{1/2}$.

FIG. 2a is a chart which represents the variations in the blur of a set of eight initial lenses as a function of azimuth 6, for the elevation reference value $\alpha_R$ of 36° (degrees). These eight lenses, which are designated respectively by D1-D8, have one and the same addition value equal to 1.00 diopter, corresponding to a young presbyopic subject. They are distinguished by different designs. In this case, the first contribution $C_1$ to the blur of the lenses has been determined in accordance with the first mode of calculation presented above, assuming that the first fixed addition value $Add_1$ is greater than 1.00 diopter. In this case, the blur of the lenses comprises only the second contribution $C_2$ which has been calculated as indicated hereinabove.

FIGS. 2b and 2c correspond to FIG. 2a for two other sets of eight initial lenses, having an addition of 2.00 diopters (FIG. 2b: lenses D11 to D18) and 3.00 diopters (FIG. 2c: lenses D21 to D28). The blur of each lens has been calculated as previously, assuming that the first and second fixed addition values $Add_1$ and $Add_2$ are respectively equal to 1.6 diopters and 2.4 diopters. FIG. 2b corresponds to the case of a wearer who exhibits medium presbyopia level, and FIG. 2c to the case of a wearer who exhibits an advanced level of presbyopia.

A blur perception threshold value for the wearer for whom the final lens is intended is thereafter determined. This threshold value is determined according to a criterion for perception of blur which varies as a function of the addition value prescribed for the wearer. This involves a criterion of detection of blur by the subject when the addition thereof is less than a first fixed value, a criterion of visual inconvenience due to the blur when the addition thereof is intermediate between this first fixed value and a second fixed value, and a criterion of loss of readability when the addition thereof is greater than this second fixed value. These first and second addition values which are fixed so as to select the criterion for perception of blur to be used may lie respectively between 1.50 and 1.75 diopters, and between 2.25 and 2.50 diopters. When the first contribution $C_1$ to the blur of each initial lens is determined according to the first mode of calculation which was presented above, the values $Add_1$ and $Add_2$ introduced in this mode of calculation may be respectively identical to the first and to the second fixed value which are used to select the blur perception criterion.

Preferably, the blur perception threshold value is determined for the wearer by carrying out a test of the perception of the blur by this wearer, and by using the perception criterion selected as has just been described. This blur perception test may comprise a viewing by the wearer of an image through an optical system, with the optical system which is adapted for producing a variable defocusing of the image with respect to a fine-tuning adjustment of this image looked at by the wearer. FIG. 3a illustrates the principle of such a test. The subject 100 looks at an alphanumeric character C which is inscribed on a screen 11 through the optical system 10. The character C is inscribed on the screen 11 with a sharp and precise contour, and the optical system 10 is adjusted so as to focus on the retina of the subject 100 light arising from points situated in a plane P which is offset with respect to the screen 11. During the test, the adjustment of the system 10 is varied so as to move the plane P closer to or further from the screen 11.

According to another possibility, the blur perception test may comprise a viewing by the wearer of an image which is displayed on a screen, with a simulated blur which is introduced numerically into the display data of the image. In FIG. 3b, the references 12 and 13 designate the display screen and a computerized unit which calculates the image and controls the display thereof. C further designates an alphanumeric character, but which is displayed during successive periods with variable blurs which are calculated by the unit 13.

One of the initial lenses is then selected, corresponding to the wearer's prescription and having a blur value for the elevation and azimuth reference values which exhibits a discrepancy of less than 0.50 diopters in absolute value, with respect to the blur perception threshold value which has been obtained for the wearer. Stated otherwise, this lens which is selected corresponds at one and the same time to the wearer's prescription and exhibits, for the direction of gaze $D_R$, a blur value which is substantially equal to the threshold value obtained for the wearer. When this initial lens exists among the series of progressive lenses which is used, it itself forms the final lens.

By way of examples, three future wearers of progressive lenses according to the invention are considered, for whom the prescribed addition values and the threshold values of blur perception are given in the following table:

|  | Wearer 1 | Wearer 2 | Wearer 3 |
|---|---|---|---|
|  | Young presbyope | Medium presbyope | Advanced presbyope |
| Prescribed addition | 1.00 diopter | 2.00 diopters | 3.00 diopters |
| Blur perception test | Detection of blur | Visual inconvenience | Loss of readability |
| Blur threshold value | 0.30 diopters | 0.70 diopters | 0.70 diopters |
| First contribution $C_1$ to the blur of the lens | zero | $0.5 \times |P - PPO|$ | $|P - PPO|$ |

-continued

|  | Wearer 1 | Wearer 2 | Wearer 3 |
|---|---|---|---|
| Initial lenses | FIG. 2a | FIG. 2b | FIG. 2c |
| Final lens selected | D5 | D14 | D23 |

This table furthermore indicates the blur perception test and the formula for calculating the first contribution to the blur of the initial lenses which are used for each of the wearers. The selection of the final lens for each wearer is illustrated in the corresponding figure noting therein the azimuth reference value $\beta_R$ and the blur perception threshold value determined for the wearer, and denoted VS. That one of the initial lenses whose blur profile for the elevation reference value $\alpha_R$ passes through the point with coordinates $\beta_R$ and VS in the corresponding chart is the final lens which is selected.

Optionally, it is possible that the blur discrepancy for the direction $D_R$, with respect to the blur perception threshold value which has been obtained for the wearer, may be greater than 0.50 diopters in absolute value for all the progressive lenses of the series used which correspond to the wearer's prescription. In this case, at least two initial lenses may be selected from the series which each correspond to the prescription, and their individual characteristics are combined mathematically to form a final lens whose blur, for the direction $D_R$, is equal to the threshold value obtained for the wearer to within less than 0.50 diopters. Such a combination of lenses whose characteristics are available, to form a new lens which satisfies a required condition such as the threshold value of the blur for the direction $D_R$, is known to the person skilled in the art. For example, the surfaces which form one and the same face of the lenses are described by values of sagittal height measured with respect to a reference surface. The surface of the final lens is then written as a linear combination of the corresponding surfaces of the selected initial lenses, with coefficients in the linear combination which are numerically optimized so that the final lens satisfies the required condition.

According to an alternative implementation of the invention, the lenses of the series may be defined by respective numerical characterizations which are recorded. The reference direction of gaze $D_R$ is then fixed in the same manner as was described above, just like the blur perception threshold value VS which is obtained for the wearer. The selection of the final lens in this alternative implementation of the invention can comprise the following sub-steps:

selecting an initial lens from the series so that it corresponds to the prescription which has been obtained for the wearer, and optionally as a function of a value of an additional parameter which is established for the wearer; and then numerically optimizing the final lens on the basis of the initial lens thus selected by introducing into the optimization the blur perception threshold value which has been obtained for the wearer in the guise of target value of the blur for the reference values of elevation $\alpha_R$ and of azimuth $\beta_R$.

In this case, the optimization pertains to the optical characteristics of the final lens, unlike in the previous case where the optimization pertained to the coefficients of the linear combination of the initial lenses which have been selected from the series used.

The additional parameter which is optionally used to select the initial lens, supplementary to the wearer's prescription, may be one of the parameters which are usually used to select a progressive lens design. For example, this may be a relative amplitude of rotation of the eyes which is determined for the wearer, with respect to rotation movements of his head when he looks successively at objects which are situated in different directions.

Thus, the final lens may be selected in diverse ways in accordance with the various modes of implementation of the invention which have been described. It may be directly one of the lenses available initially in the series. Alternatively, the final lens might not belong to the series of progressive lenses which are initially available. In this case, it may result from an appropriate combination of several of the lenses of the series, or result from an optical optimization which is carried out on the basis of one of the lenses of the series.

Finally, the lens with which the wearer is provided is manufactured in accordance with the final lens which has been selected. When this final lens is an available semi-finished lens which possesses a definitive face in accordance with the prescribed addition and with the threshold value of the blur for the direction $D_R$, it may be made by machining its other face. This machining produces a spherical or toric shape which complies with the prescribed optical power value for far vision and with the astigmatism characterization of the wearer's prescription, having regard to the curvature of the definitive face for the reference direction for far vision. Alternatively, the final lens may be machined point by point on at least one of its two faces, for example by using the machining method known by the term "Freeform®".

Finally, generally in an arbitrary implementation of the invention, the final lens may be selected preferably so that its blur value for the reference values of elevation $\alpha_R$ and of azimuth $\beta_R$ exhibits a discrepancy which is less than 0.25 diopters in absolute value, with respect to the blur perception threshold value which has been obtained for the wearer. In a still more preferred manner, the final lens may be selected so that this discrepancy is less than 0.1 diopters, or indeed less than 0.05 diopters.

The invention claimed is:

1. A method for manufacturing a progressive spectacle lens for an identified wearer, and customized as a function of a perception of blur by said wearer, comprising:
   /1/ obtaining an ophthalmic prescription for the wearer, comprising a prescribed value of optical power in far vision, a prescribed addition value and a characterization of an astigmatism of said wearer;
   /2/ obtaining a blur perception threshold value for the wearer;
   /3/ obtaining respective blur values for a series of progressive ophthalmic lenses corresponding to variable prescriptions, and for a reference direction of gaze offset transversely with respect to a meridian line of the lenses, said reference direction of gaze being determined by an elevation reference value along the meridian line and an azimuth reference value measured from and transversely with respect to said meridian line;
   /4/ selecting a final lens based on at least one initial lens belonging to the series used in step /3/, said final lens corresponding to the wearer's prescription and having a blur value for the elevation and azimuth reference values which exhibits a discrepancy of less than 0.50 diopters in absolute value, with respect to the blur perception threshold value obtained for the wearer in step /2/; and
   /5/ manufacturing the spectacle lens in accordance with the final lens selected in step /4/;
   wherein step /2/ comprises the following two sub-steps:
   /2-1/ selecting a blur perception criterion as a function of the prescribed addition value for the wearer, from among the following criteria:

when the prescribed addition value for the wearer is less than or equal to a first fixed addition value, the blur perception threshold value is a first blur limit below which said wearer does not detect the blur, and beyond which said wearer detects the blur;

when the prescribed addition value for the wearer lies between the first fixed addition value and a second fixed addition value greater than said first fixed addition value, the blur perception threshold value is a second blur limit below which said wearer does not experience any visual inconvenience caused by the blur, and beyond which said wearer experiences visual inconvenience caused by the blur; and when the prescribed addition value for the wearer is greater than or equal to the second fixed addition value, the blur perception threshold value is a third blur limit below which said wearer is capable of reading alphanumeric characters, and beyond which said wearer is no longer capable of reading the alphanumeric characters because of the blur; and then /2-2/ determining the blur perception threshold value for the wearer by using the selected criterion.

2. The method as claimed in claim 1, wherein the blur perception threshold value is determined for the wearer in sub-step /2-2/ by carrying out a test of blur perception by said wearer, using the criterion selected in sub-step /2-1/.

3. The method as claimed in claim 2, wherein the blur perception test comprises a viewing by the wearer of an image through an optical system, said optical system being adapted for producing a variable defocusing of the image with respect to a fine-tuning adjustment of said image looked at by the wearer.

4. The method as claimed in claim 2, wherein the blur perception test comprises a viewing by the wearer of an image displayed on a screen with a simulated blur introduced numerically into the display data of the image.

5. The method as claimed in claim 1, wherein the first fixed addition value lies between 1.50 and 1.75 diopters, and the second fixed addition value lies between 2.25 and 2.50 diopters.

6. The method as claimed in claim 1, wherein the azimuth reference value lies between 10° and 20°, preferably between 13° and 17°, in absolute value.

7. The method as claimed in claim 1, wherein the azimuth reference value is obtained based on a measurement of an amplitude of eye movements performed by the wearer.

8. The method as claimed in claim 1, wherein the reference direction of gaze passes through at least one of the lenses of the series used in step /3/ in a near vision zone or in a far vision zone of said lens, or at a lateral limit of one of said zones.

9. The method as claimed in claim 8, wherein the elevation reference value lies between 20° and 45°, or lies between −10° and 2° with respect to a direction of gaze-(D) passing through a fitting cross of each lens, said elevation values being positive and negative for directions of gaze passing below and above the fitting cross, respectively.

10. The method as claimed in claim 1, wherein the blur value obtained in step /3/ for each lens of the series is calculated as a sum comprising the following two contributions:

a first positive contribution dependent on a first absolute difference between on the one hand an optical power value deduced from the prescription of the wearer for the elevation reference value, and on the other hand an optical power value of the lens for said respective reference values of elevation and of azimuth; and a second positive contribution dependent on a second absolute difference between, on the one hand the characterization of the astigmatism of the wearer obtained in step /1/, and on the other hand a characterization of astigmatism of the lens for said respective reference values of elevation and of azimuth;

said first contribution furthermore varying as a function of the addition value of the lens so that, for at least one fixed value of the first difference, the first contribution is an increasing or stepwise increasing function of said addition value of the lens.

11. The method as claimed in claim 10, wherein the first positive contribution is equal to the first absolute difference multiplied by a factor equal to:
zero when the addition value of the lens is less than or equal to the first fixed addition value;
a half when the addition value of the lens lies between the first fixed addition value and the second fixed addition value; and
unity when the addition value of the lens is greater than or equal to the second fixed addition value.

12. The method as claimed in claim 10, wherein the first contribution is equal to the first absolute difference divided by a decreasing function of the addition value of the lens, or divided by an increasing function of an amplitude of accommodation determined for the wearer.

13. The method as claimed in claim 1, wherein:
the series of lenses used in step /3/ comprises for each prescription several lenses corresponding to variable blur values for the reference values of elevation and of azimuth, and
step /4/ comprises a selection of an initial lens in the lens series so that said initial lens itself corresponds to the wearer's prescription and has a blur value for the elevation and azimuth reference values which exhibits a discrepancy of less than 0.50 diopters in absolute value, with respect to the blur perception threshold value obtained for the wearer in step /2/, said initial lens itself forming the selected final lens.

14. The method as claimed in claim 1, wherein the lenses of the series used in step /3/ are defined by recorded respective numerical characterizations, and in accordance with which step /4/ comprises the following sub-steps:
/4-1/ selecting an initial lens in the series used in step /3/, so that said initial lens corresponds to the prescription obtained in step /1/ for the wearer, and optionally as a function of a value of an additional parameter established for the wearer; and then
/4-2/ numerically optimizing the final lens based on the initial lens by introducing into the optimization the blur perception threshold value obtained in step /2/ for the wearer in the guise of target value of the blur for the reference values of elevation and of azimuth.

15. The method as claimed in claim 1, wherein the final lens is selected in step /4/ so that the blur value of said final lens for the reference values of elevation and of azimuth exhibits a discrepancy of less than 0.25 diopters in absolute value with respect to the blur perception threshold value obtained for the wearer in step /2/.

* * * * *